US012038143B1

(12) United States Patent
Chen

(10) Patent No.: US 12,038,143 B1
(45) Date of Patent: Jul. 16, 2024

(54) LIGHT STRIP FACILITATED FOR SHAPE FORMING AND SHAPED LIGHT ORNAMENT FORMED THEREFROM

(71) Applicant: ZHU HAI FUYUN LIGHTING INDUSTRIAL CO., LTD., Zhuhai (CN)

(72) Inventor: Suhua Chen, Zhuhai (CN)

(73) Assignee: ZHU HAI FUYUN LIGHTING INDUSTRIAL CO., LTD., Zhuhai (CN)

( * ) Notice: Subject to any disclaimer, the term of this patent is extended or adjusted under 35 U.S.C. 154(b) by 0 days.

(21) Appl. No.: 18/355,069

(22) Filed: Jul. 19, 2023

Related U.S. Application Data

(63) Continuation-in-part of application No. PCT/CN2023/089166, filed on Apr. 19, 2023.

(30) Foreign Application Priority Data

Mar. 30, 2023 (CN) ........................ 202320683400.1

(51) Int. Cl.
*F21S 4/24* (2016.01)

(52) U.S. Cl.
CPC ...................................... *F21S 4/24* (2016.01)

(58) Field of Classification Search
CPC ........................................................ F21S 4/24
See application file for complete search history.

(56) References Cited

U.S. PATENT DOCUMENTS

| | | | | |
|---|---|---|---|---|
| 6,186,645 | B1 * | 2/2001 | Camarota | F21S 8/032<br>362/240 |
| 8,366,291 | B2 * | 2/2013 | Hoffmann | F21S 8/022<br>362/225 |
| 10,520,143 | B1 * | 12/2019 | Findlay | F21V 31/04 |
| 11,162,654 | B2 * | 11/2021 | Walsh | F21S 4/20 |
| 11,655,946 | B1 * | 5/2023 | Zhang | F21V 31/04<br>362/217.01 |
| 2003/0193803 | A1 * | 10/2003 | Lin | F21S 4/24<br>362/800 |
| 2005/0231947 | A1 * | 10/2005 | Sloan | G09F 9/33<br>362/235 |
| 2016/0025278 | A1 * | 1/2016 | Camarota | F21V 15/012<br>29/428 |
| 2023/0071594 | A1 * | 3/2023 | Chen | F21S 4/24 |

FOREIGN PATENT DOCUMENTS

| | | | |
|---|---|---|---|
| CN | 101858527 | A | 10/2010 |
| CN | 205716625 | U | 11/2016 |
| CN | 206918736 | U | 1/2018 |
| CN | 207230250 | U | 4/2018 |
| DE | 202016106375 | U1 | 11/2016 |
| WO | 2015/157898 | A1 | 10/2015 |

* cited by examiner

*Primary Examiner* — Evan P Dzierzynski
(74) *Attorney, Agent, or Firm* — RABIN & BERDO, P.C.

(57) ABSTRACT

A light strip facilitated for shape forming includes a flexible member and a light emitting assembly. The flexible member has an elongated shape and includes a light transmissive portion and a cavity arranged at an internal thereof. The light emitting assembly includes a plurality of light emitting elements arranged spaced apart from each other and inside the cavity. The flexible member includes a slot arranged at one side and extending in the same direction and is used for clamping and securing to a stand portion formed by a metal wire, in order to form a planer or three-dimensional shaped light ornament.

20 Claims, 10 Drawing Sheets

LIGHT STRIP FACILITATED FOR SHAPE FORMING AND SHAPED LIGHT ORNAMENT FORMED THEREFROM

BACKGROUND OF THE INVENTION

1. Technical Field

The present invention is related to a light strip, and in particular, to a light strip structure facilitated for shape forming and a characteristic shaped light ornament formed from the use of the light strip.

2. Description of Related Art

For a currently available flexible silicone light strip, it mainly consists of a light transmissive flexible silicone, an opaque flexible silicone, LED modules and a metal wire. The LED modules and metal wires are installed on the opaque flexible silicone and then concealed inside the light transmissive flexible silicone. The LED modules emit light via the light transmissive flexible silicone with light guiding effect. The metal wire with plastic deformation capability is able to provide the plastic deformation for the light strip.

Although the currently available flexible silicone light strip is equipped with the plastic deformation capability and can be used for field laying and installation with simple bending plastic deformation, nevertheless, when it is used to construct a complicated pattern light ornament, since the metal wire used for plastic deformation is loosely installed inside the flexible wrapping material, the bending and curve precision cannot be ensured during the automated plastic deformation operation, such that it is difficult to form shapes that are relatively complicated or exquisite lighting patterns. If manual method is adopted to form complicated shapes, the work load becomes too great and the repetitive adjustments is also time consuming. In view of such drawbacks, currently available products are found to have limitations in the shape forming and styling such that they cannot be used to create a characteristic shaped light ornament easily.

In view of the above, the inventor seeks to improve and to provide an innovative design capable of overcoming the drawbacks of the currently available products by providing a light strip facilitated for shape forming that can be easily installed and secured on a light stand formed by a metal wire, in order to achieve an exquisite characteristic shaped light ornament.

BRIEF SUMMARY OF THE INVENTION

A primary objective of the present invention is to provide a light strip facilitated for installation and positioning in order to form a characteristic shaped light ornament, such that it is able to reduce the shape formation operation difficulty significantly and to construct exquisite and complicated shape easily.

Accordingly, the light strip facilitated for shape forming of the present invention mainly adopts the technical means and structural features that the light strip main body comprises a flexible member and a light emitting assembly. The flexible member has an elongated shape and comprises a light transmissive portion and a cavity formed inside the light transmissive portion, and the cavity extends toward an extension direction of the flexible member. The light emitting assembly comprises a plurality of light emitting elements arranged spaced apart from each other inside the cavity. In addition, the flexible member further comprises a slot arranged at one side thereof and configured for clamping securement, the slot is formed between two protrusions with an recovery elasticity, and an opening of the slot is formed at one side of the slot away from the cavity; and the slot, the two protrusions and the opening extend along the extension direction of the flexible member.

Furthermore, another objective of the present invention is to allow a light strip facilitated for shape forming to be attached to a characteristic stand in order to form an exquisite shaped light ornament.

The technical means and structural features adopted by the shaped light ornament comprises a light strip facilitated for shape forming of the present invention and a stand portion. The stand portion is formed by at least one flexible shaping metal wires. In addition, the light strip uses the slot for clamping and securing to the metal wire, such that the light strip is installed and fixed to the stand portion, thereby forming a planar or three-dimensional shaped light ornament.

According to the aforementioned structure, wherein a projection of the slot in the extension direction has an arc shape, and a width of the opening of the slot is between a radius and a diameter of the slot. With such structure, the slot having an inner surface of an arc shape is able to fit to most of metal wires normally in order to establish firm clamping securement, thereby increasing the overall adaptability of the product.

According to the aforementioned structure, wherein a central angle corresponding to the opening of the slot is preferably between 60~100 degree. With such structure, the slot can be securely clamped to the metal wire in order to prevent disengagement.

According to the aforementioned structure, wherein the flexible member further includes an appropriate light shielding portion depending upon the characteristic needs, in order to allow the light strip to emit light based on the predefined direction, such that the light strip or the shaped light ornament formed from the light strip is able to achieve diverse lighting effect. In addition, the light shielding portion may be any one of a first light shielding portion, a second light shielding portion and a third light shielding portion described in the following. The first light shielding portion is attached to one side of the light transmissive portion, and the slot is formed at the first light shielding portion. The second light shielding portion is attached to another side of the light transmissive portion opposite from the first light shielding portion. Furthermore, the third light shielding portion is attached to one side of the light transmissive portion adjacent to the first light shielding portion, and the third shielding portion is connected to the first light shielding portion and the second light shielding portion respectively.

Accordingly to the aforementioned structure, wherein the flexible member further comprises a hollow channel arranged at the light transmissive portion, in order to assist the light diffusion and to increase the buffer capability, thereby allowing the light strip to generate gentle light emitting effect and to achieve enhanced impact resistance effect for the internal light emitting assembly. In addition, the hollow channel can be arranged at another side of the cavity opposite from the slot or at another side of the cavity opposite from the third light shielding portion.

According to the aforementioned structure, wherein the light emitting assembly further comprises a conductor connected to the light emitting elements, the conductor is formed by at least one flexible conductive wire or a flexible conductive board, and the conductor penetrates into the cavity along the extension direction of the flexible member.

The present invention is able to utilize automated processing to form the metal wire with precise bending and curving in position, in order to construct a precise base stand. The entirety of the light strip is of the flexible characteristic such that it can be easily secured to the metal wire with the slot in order to complete installation and securement, thereby achieving the exquisite shaped light ornament that cannot be formed easily by existing products. In view above, it can be understood that the present invention is able to significantly reduce the shaping difficulty and has a simple structure with convenient installation, such that it can be widely applied to the formation of a characteristic shaped light ornament of complicated shape and exquisite appearance.

To further illustrate the aforementioned objectives, effects and technical features of the present invention, the following describes preferred embodiments of the present invention in conjunction with the accompanied drawings:

DETAILED DESCRIPTION OF THE INVENTION

Figure 1:
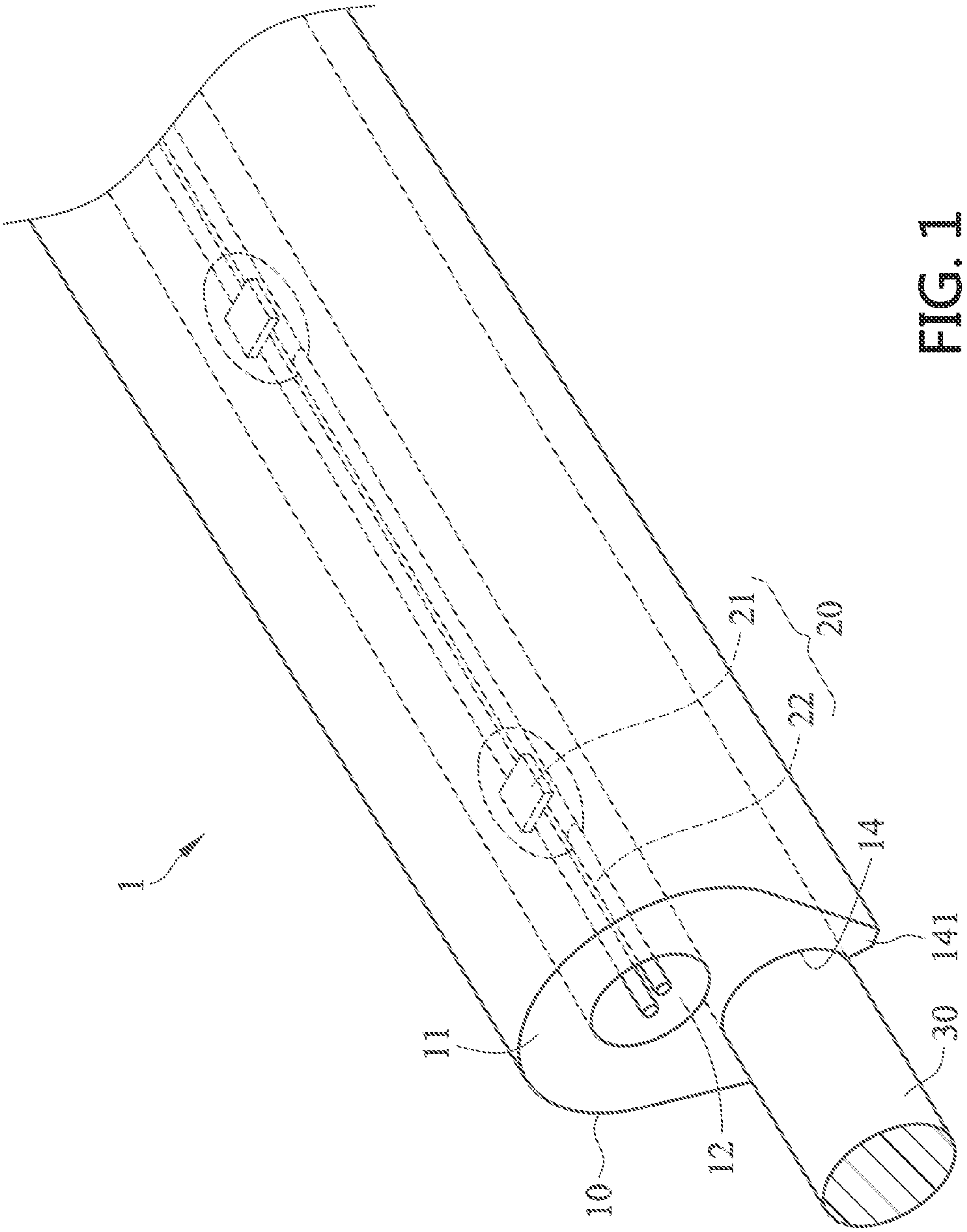
FIG. 1 is a perspective view of a basic type of light strip of the present invention clamping and securing a metal wire.
Figure 2:
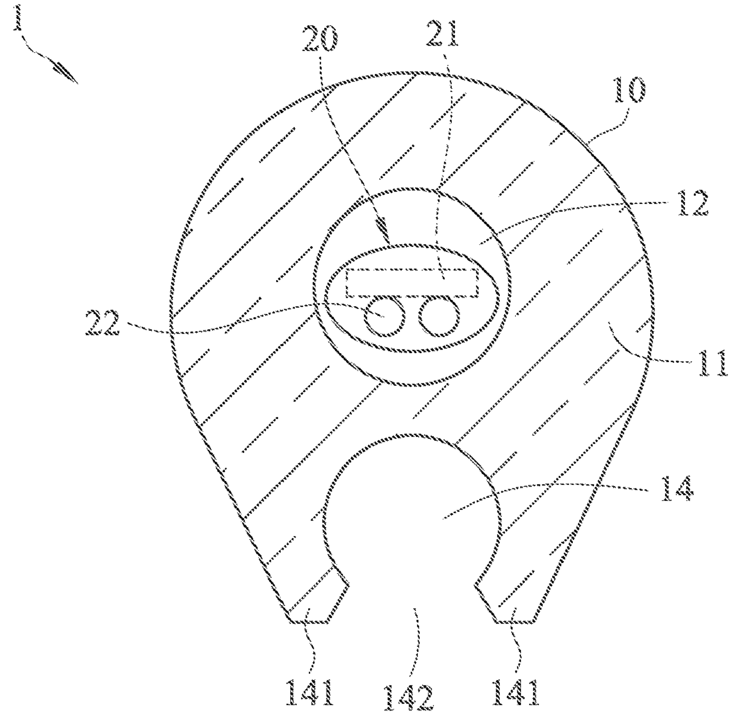
FIG. 2 is a cross sectional structural view of a portion of the light strip shown in FIG. 1 without clamping and securing the metal wire.
Figure 3:
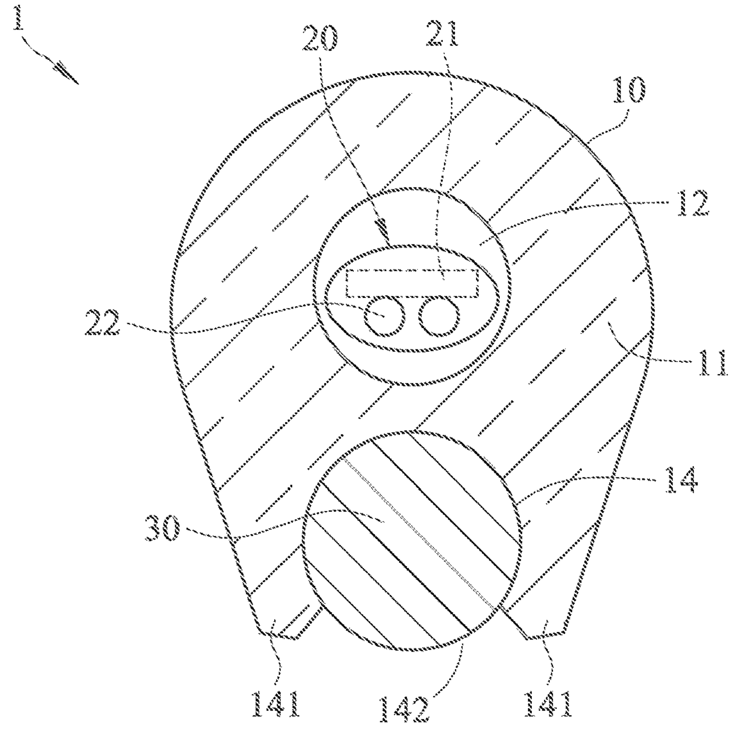
FIG. 3 is a cross sectional structural view of FIG. 1.

Please refer to FIG. 1 to FIG. 3, showing a light strip 1 of a basic type of structure of the present invention, and it structure comprises a flexible member 10 having an elongated shape and a light emitting assembly 20 arranged at the internal of the flexible member 10.

In such basic type of structure, the flexible member 10 is formed by a light transmissive portion 11. The light transmissive portion 11 is made of a light transmissive and flexible material, such as a silicone material that is transparent and colorless or semi-transparent with a color, in order to form a flexible silicone strip/belt with elasticity and recovery capability. The internal of the light transmissive portion 11 includes a cavity 12, and the cavity 12 has an elongated shape identical to the extension direction of the flexible member 10. In addition, the flexible member 10 includes a slot 14 formed at one side thereof. The slot 14 is formed between two protrusions 141 with an recovery elasticity and used for clamping and securing to a metal wire 30. In addition, the opening 142 of the slot 14 is formed at one side of the slot 14 away from the cavity 12.

In addition, the slot 14, the two protrusions 141 and the opening 142 extend along the extension direction of the flexible member 10. FIG. 2 and FIG. 3 shows the projection of the overall extension direction of the light strip 1 or a cross sectional view thereof. The slot 14 is generally of a circular arc shape, and the cut-out portion is the opening 142, and its width is between its radius and diameter, and a width corresponding to the central angle of 60~100 degree is preferred. Accordingly, with the recovery elasticity of the flexible member 10, the slot 14 can be firmly clamped onto the metal wire 30 easily during installation and use without disengagement.

The light emitting assembly 20 comprises a plurality of light emitting elements 21 arranged spaced apart from each other inside the cavity 12 and a conductor for connecting the light emitting elements 21. The light emitting elements 21 mainly refer to small size LED modules. In this embodiment, the conductor can be a flexible conductive wire 22, and the conductive wire 22 penetrates into the cavity 12 along the extension direction of the flexible member 10.

Figure 4:
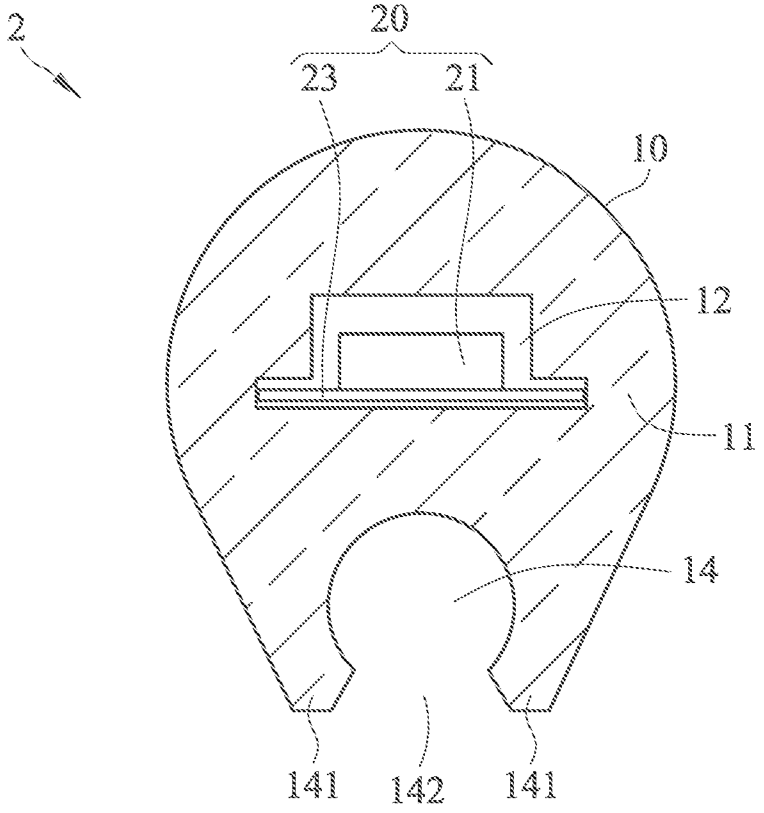
FIG. 4 is another cross sectional structural view of the basic type of light strip of the present invention.

Please refer to FIG. 4, showing the structure of another basic type of light strip 2 of the present invention, and it comprises the same parts of the aforementioned flexible member 10, light transmissive portion 11 and slot 14 (two protrusions 141 and opening 142). The main difference relies in that the light emitting element 20 uses a flexible conductive board 23 for connecting the light emitting elements 21 and penetrates into the cavity 12 along the extension direction of the flexible member 10. In addition, the cavity 12 installed at the light transmissive portion 11 is configured to have an appropriate shape matching with the light emitting assembly 20.

In a feasible embodiment of the present invention, for the conductor of the light emitting assembly 20, any type of flexible conductive wire 22 or flexible conductive board 23 can be selected for use freely without limitation in order to connect the light emitting elements 21 arranged spaced apart from each other, and both are able to achieve the effect of cooperating with the flexible movement of the flexible member 10. For the embodiments described in the following, a single type of the conductor will be used for illustration; however, it shall be understood that the present invention is not limited to such single type of embodiment only.

In the preceding two embodiments, the light emitted from the light emitting assembly 20 at the center is able to scatter out from the light transmissive portion 11, in order to achieve the effect of natural light output except for the directions of the conductive board 23 and the metal wire 30 (both in the same direction).

Figure 5:
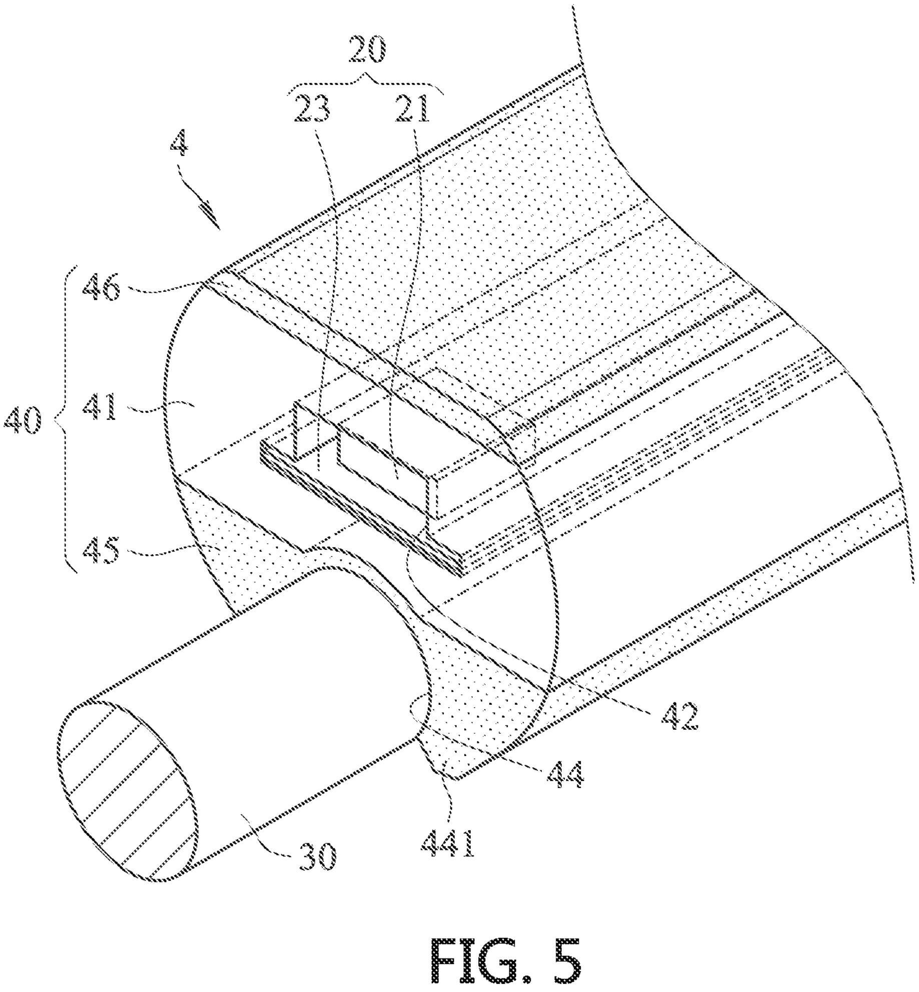
FIG. 5 is a perspective view of a variant of light strip of the present invention clamping and securing a metal wire.
Figure 6:
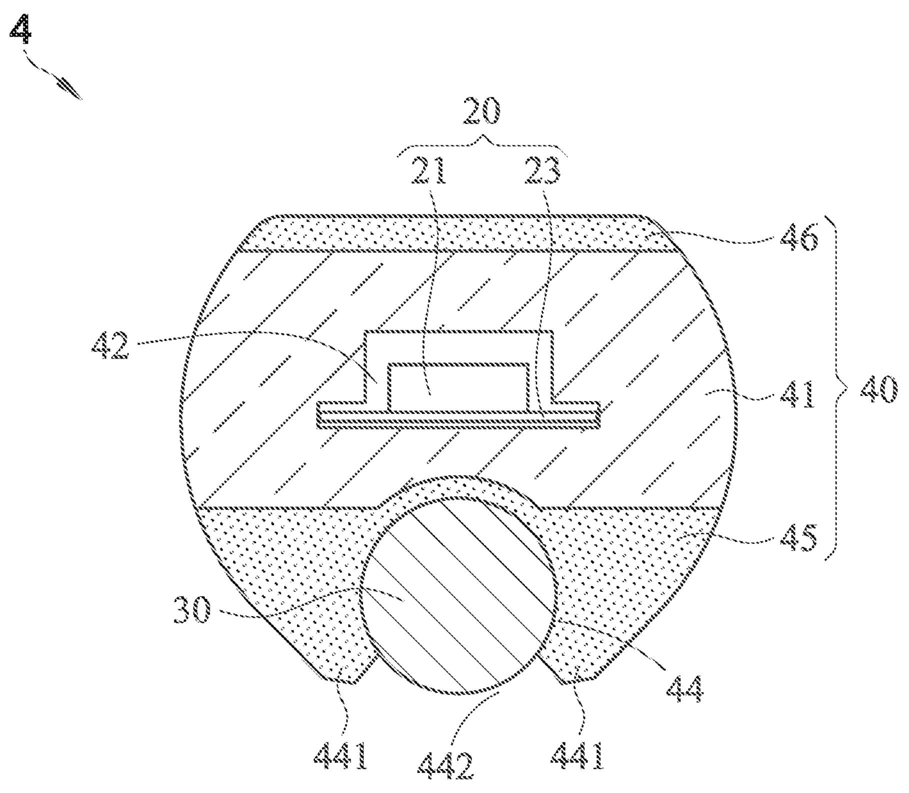
FIG. 6 is a cross sectional structural view of FIG. 5.

Please refer to FIG. 5 and FIG. 6, showing a variant light strip 4 structure of the present invention. The variant disclosed by the present invention mainly refers to the modification of the light output and shielding, allowing the light strip 4 to achieve lighting effect of greater diversity in order to satisfy various characteristic lighting demands.

The light strip 4 comprises a flexible member 40 having an elongated shape and a light emitting assembly 20 arranged inside the flexible member 40. In this variant structure, the flexible member 40 is formed by a light transmissive portion 41, a first light shielding portion 45 and a second light shielding portion 46, and all these three parts extend along the extension direction of the flexible member 40. In addition, the first light shielding portion 45 and the second light shielding portion 46 are attached to the two lower and upper outer sides of the light transmissive portion 41 opposite from each other, in order to shield or block light from the corresponding directions. The light transmissive portion 41 is the same as the previous embodiment and is made of a light transmissive flexible material, such as a silicone material that is transparent and colorless or semi-transparent with a color, and the first light shielding portion 45 and the second light shielding portion 46 are made of opaque flexible silicone material, allowing the overall flexible member 40 to form a flexible silicone strip/belt equipped with the elastic and recovery capabilities.

The internal of the light transmissive portion 41 includes a cavity 42, and the cavity 42 has an elongated shape identical to the extension direction of the flexible member 40. The light emitting assembly 20 is arranged inside the cavity 42, and comprises a plurality of light emitting elements 21 arranged spaced apart from each other and a conductor for connecting the light emitting elements 21. The light emitting elements 21 are the same as the previous embodiment and refer to small size LED modules. The conductor can be a flexible conductor board 23, and the conductor board 23 penetrates into the cavity 42 along the extension direction of the flexible member 40.

The flexible member 40 includes a slot 44 arranged at the first light shielding portion 45 away from the cavity 42. The slot 44 is formed between the two protrusions 441 with recovery elasticity and used for clamping and securing to a metal wire 30. In addition, the opening 442 of the slot 44 is formed at one side of the slot 44 away from the cavity 42. In addition, the slot 44, the two protrusions 441 and the opening 442 extend along the extension direction of the flexible member 40. The inner side of the slot 44 is of a circular arc shape (extension projection plane or cross sectional area), the cut-out portion of the slot 44 is the opening 442, and its width is between its radius and diameter, and a width corresponding to the central angle of 60~100 degree is preferred. Accordingly, with the recovery elasticity of the material, it is able to achieve the effect of facilitated installation and stable clamping securement without disengagement.

In this embodiment, the upper and lower sides of the light transmissive portion 41 are shielded by the second and first light shielding portions 46, 45 respectively. In addition, the two left and right sides include the light output portions, allowing the light emitted from the light emitting assembly 20 at the center to exit from the light output portions centralized at the two left and right sides, thereby achieving a lighting effect with freely scattered light that is different from the two embodiments previously disclosed.

Figure 7:
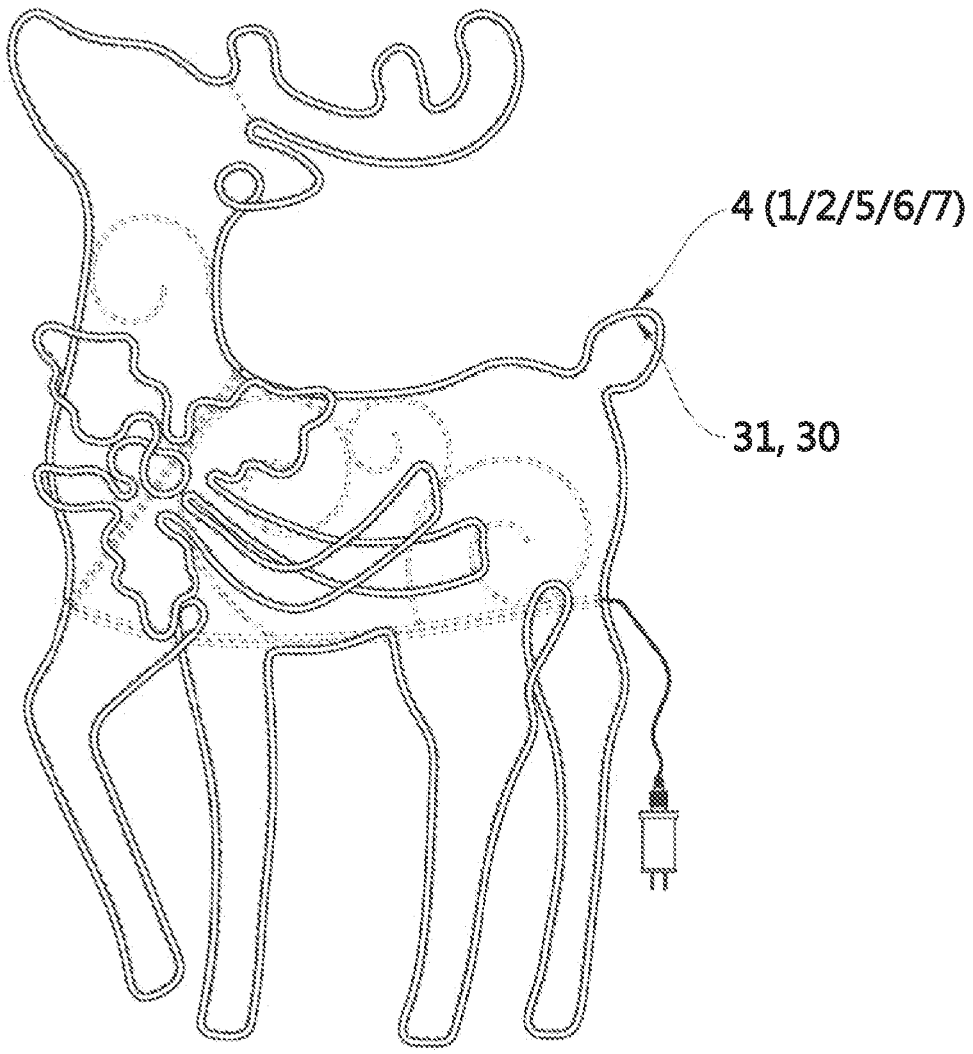
FIG. 7 is a schematic view showing an embodiment of the present invention applied to a shaped light ornament.
Figure 8:
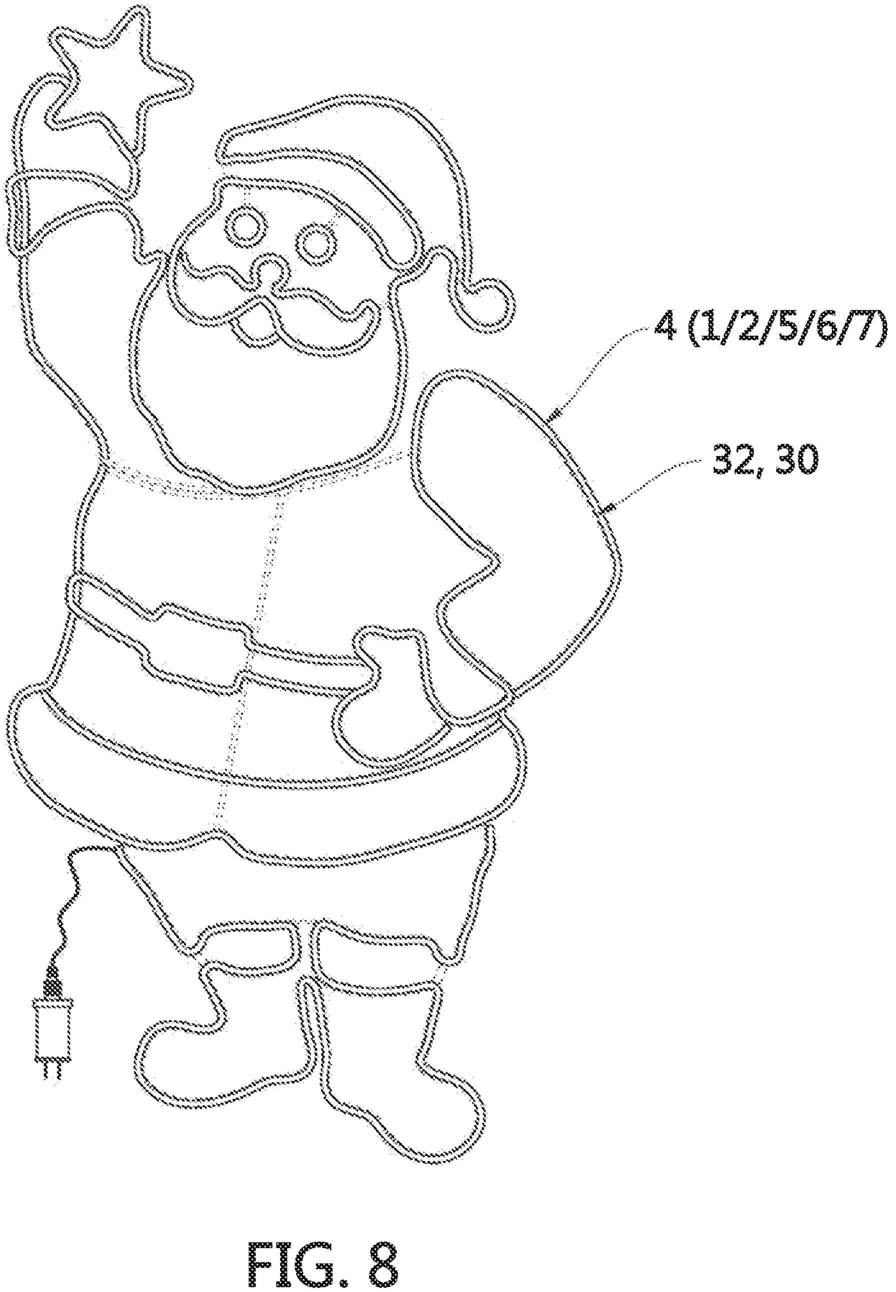
FIG. 8 is a schematic view showing an embodiment of the present invention applied to another shaped light ornament.

During the actual application of the present invention, as shown in FIG. 7 and FIG. 8, the slot 44 of the light strip 4 can be used to attach and secure the light strip 4 to the metal wire 30 of the predefined stand in order to complete the installation easily and to form various characteristic shaped light ornaments. Furthermore, the light strip 4 is not limited to the embodiments previously disclosed only. In other words, any one of the light strips 1, 2, 5, 6 and 7 described in the above or following content can be used, and the stand can be made of at least one flexible metal wire 30 for shaping. In addition, automated processing can also be used to performing bending and winding of the metal wire 30 in order to form various types of shaped stands, such as a first stand 31 having the shape of a reindeer (as shown in FIG. 7), a second stand 32 having a shape of a Santa Clause (as shown in FIG. 8), etc. The light strip 4 (1/2/5/6/7) can be easily and stably secured and installed on the stand according to the outer appearance profile, in order to form a planar or three-dimensional shaped light ornament. Furthermore, during the installation operation, when the light strip 4 (1/2/5/6/7) is clamped and secured to the metal wire 30, adhesive application can also be made at the same time, in order to achieve securement effect of greater stability, thereby preventing any possibility of falling and disengagement due to external impact.

Figure 9:
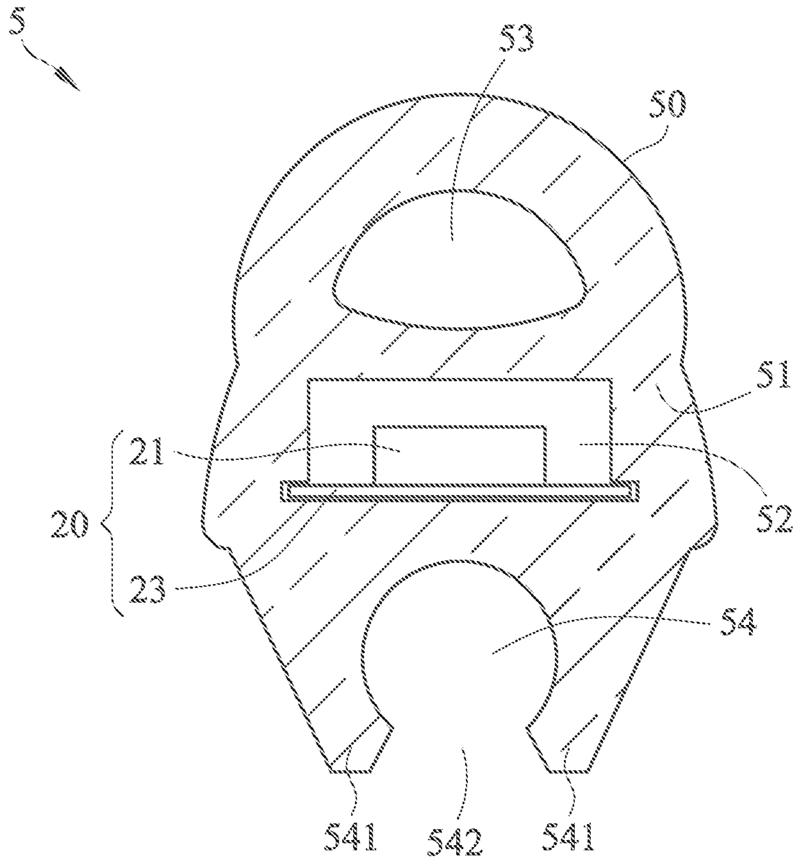
FIG. 9 is a cross sectional structural view of another variant of light strip of the present invention.

Please refer to FIG. 9, showing another variant of the light strip 5 structure of the present invention, and it comprises a flexible member 50 having an elongated shape and a light emitting assembly 20 arranged inside the flexible member 50. In this embodiment, the flexible member 50 is formed by a light transmissive portion 51. The light transmissive portion 51 is the same as the previous embodiment and is made of a light transmissive flexible material, such as a silicone material that is transparent and colorless or semi-transparent with a color, allowing the overall flexible member 50 to form a flexible silicone strip/belt equipped with the elastic and recovery capabilities.

In addition, the internal of the light transmissive portion 51 includes a cavity 52, and the cavity 52 has an elongated shape identical to the extension direction of the flexible member 50. The light emitting assembly 20 is arranged inside the cavity 52, and comprises a plurality of light emitting elements 21 arranged spaced apart from each other and a conductor for connecting the light emitting elements 21. The light emitting elements 21 are the same as the previous embodiment and refer to small size LED modules. The conductor can be a flexible conductor board 23, and the conductor board 23 penetrates into the cavity 52 along the extension direction of the flexible member 50.

The flexible member 50 includes a slot 54 formed at one side thereof. The slot 54 is formed between two protrusions 541 with recovery elasticity and used for clamping and securing to a metal wire 30. In addition, the opening 542 of the slot 54 is formed at one side of the slot 54 away from the cavity 52. The slot 54, the two protrusions 541 and the opening 542 extend along the extension direction of the flexible member 50. The inner side of the slot 54 is of a circular arc shape (extension projection plane or cross sectional area), the cut-out portion of the slot 54 is the opening 542, and its width is between its radius and diameter, and a width corresponding to the central angle of 60~100 degree is preferred. Accordingly, with the recovery elasticity of the material, it is able to achieve the effect of facilitated installation and stable clamping securement without disengagement.

In this embodiment, the flexible member 50 further includes a hollow channel 53 arranged at the light transmissive portion 51, and the hollow channel 53 is following located at another side of the cavity 52 opposite from the slot 54. The hollow channel 53 is mainly to assist the light diffusion and to enhance the buffering effect, in order to diffuse the light passing therethrough and to allow the light strip 5 to achieve an overall gentle lighting effect, as well as to provide buffer capable of resisting impact in case of external impact, thereby enhancing the protection effect for the inner side of the light emitting assembly 20.

In this embodiment, the light strip 5 is not installed with the light shielding portion to block light such that light can be scattered out from the light transmissive portion 51 freely (except for the directions of the conductive board 23 and the metal wire 30), and for the direction where the hollow channel 53 is installed, it is able to achieve light diffusion and gentle lighting effect. As a result, the central portion of the light strip 5 generates gentle lighting while the two sides have relatively more intense light output effect at the light spot locations.

Figure 10:
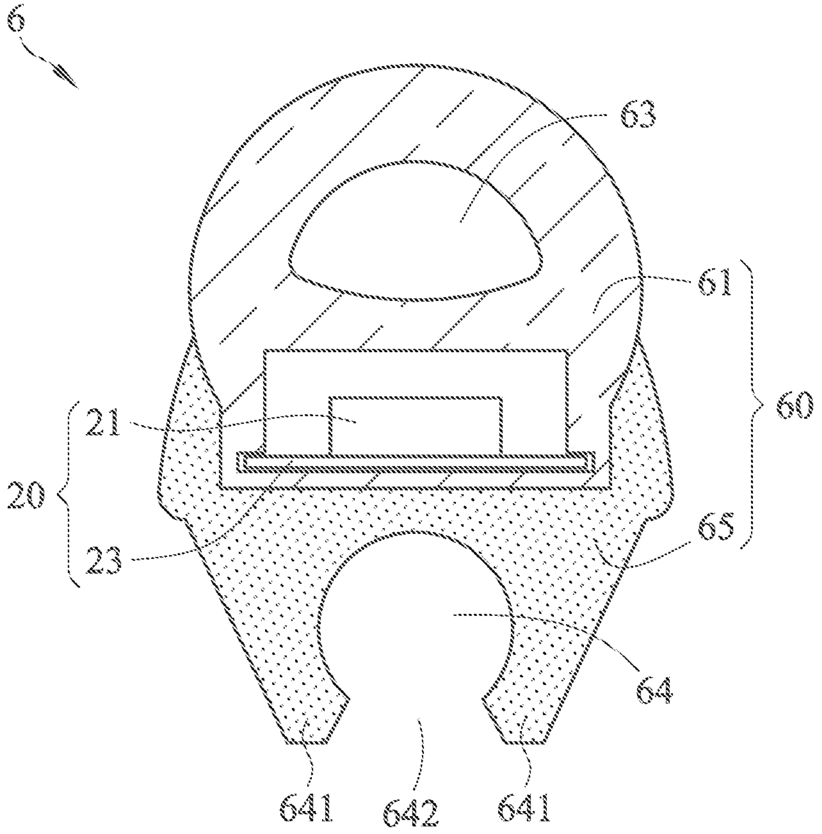
FIG. 10 is a cross sectional structural view of still another variant of light strip of the present invention.

Please refer to FIG. 10, showing another variant light strip 6 structure of the present invention, and it comprises a flexible member 60 having an elongated shape and a light emitting assembly 20 arranged inside the flexible member 60. In this embodiment, the flexible member 60 is formed by a light transmissive portion 61 and a first light shielding portion 65, and all both extend along the extension direction of the flexible member 60. In addition, the first light shielding portion 65 is attached to an outer side of the light transmissive portion 61, in order to shield or block light from the corresponding direction. The light transmissive portion 61 is the same as the previous embodiment and is made of a light transmissive flexible material, such as a silicone material that is transparent and colorless or semi-transparent with a color, and the first light shielding portion 65 is made of an opaque flexible silicone material, allowing the overall flexible member 60 to form a flexible silicone strip/belt equipped with the elastic and recovery capabilities.

In addition, the internal of the light transmissive portion 61 includes a cavity 62, and the cavity 62 has an elongated shape identical to the extension direction of the flexible member 60. The light emitting assembly 20 is arranged inside the cavity 62, and comprises a plurality of light emitting elements 21 arranged spaced apart from each other and a conductor for connecting the light emitting elements 21. The light emitting elements 21 are the same as the previous embodiment and refer to small size LED modules. The conductor can be a flexible conductor board 23, and the conductor board 23 penetrates into the cavity 62 along the extension direction of the flexible member 60.

The flexible member 60 includes a slot 64 formed at one side of the first light shielding portion 65 away from the cavity 62. The slot 64 is formed between two protrusions 641 with recovery elasticity and used for clamping and securing to a metal wire 30. In addition, the opening 642 of the slot 64 is formed at one side of the slot 64 away from the cavity 62. The slot 64, the two protrusions 641 and the opening 642 extend along the extension direction of the flexible member 60. The inner side of the slot 64 is of a circular arc shape (extension projection plane or cross sectional area), the cut-out portion of the slot 64 is the opening 642, and its width is between its radius and diameter, and a width corresponding to the central angle of 60~100 degree is preferred. Accordingly, with the recovery elasticity of the material, it is able to achieve the effect of facilitated installation and stable clamping securement without disengagement.

In this embodiment, the flexible member 60, identical to the previous embodiment, further includes a hollow channel 63 arranged at the light transmissive portion 61, and the hollow channel 63 is gentler located at another side of the cavity 62 opposite from the slot 64. The hollow channel 63 is mainly to assist the light diffusion and to enhance the buffering effect, in order to diffuse the light passing therethrough and to allow the light strip 6 to achieve an overall gentle lighting effect, as well as to provide buffer capable of resisting impact in case of external impact, thereby enhancing the protection effect for the inner side of the light emitting assembly 20.

In this embodiment, one side of the light strip 6 facing toward the metal wire 30 is shield by the first light shielding portion 65, and the light emitting assembly 20 is arranged to indent inward at the first light shielding portion 65, such that most of the light can be centralized at the direction passing through the hollow channel 63, in order to allow the light strip 6 to achieve overall uniform and gentle lighting effect.

Figure 11:
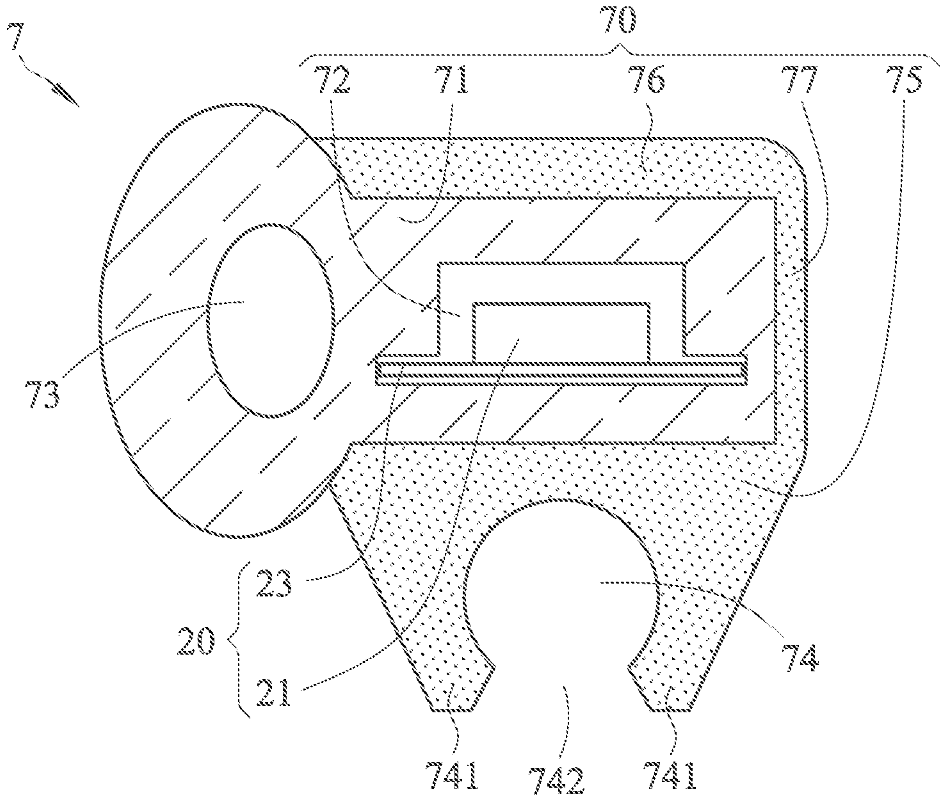
FIG. 11 is a cross sectional structural view of still another variant of light strip of the present invention.

Please refer to FIG. 11, showing still another variant light strip 7 structure of the present invention, and it comprises a flexible member 70 having an elongated shape and a light emitting assembly 20 arranged inside the flexible member 70. In this variant structure, the flexible member 70 is formed by a light transmissive portion 71, a first light shielding portion 75, a second light shielding portion 76 and a third light shielding portion 77, and all these four parts extend along the extension direction of the flexible member 70. In addition, the first light shielding portion 75 and the second light shielding portion 76 are attached to the two lower and upper outer sides of the light transmissive portion 71 opposite from each other. The third light shielding portion 77 is attached to an outer side of the light transmissive portion 71 adjacent to the first light shielding portion 75 and is connected to the first light shielding portion 75 and the second light shielding portion 76 respectively. The thee are used to shield or block light from corresponding directions. The light transmissive portion 71 is the same as the previous embodiment and is made of a light transmissive flexible material, such as a silicone material that is transparent and colorless or semi-transparent with a color; in addition, the first light shielding portion 75, the second light shielding portion 76 and the third light shielding portion 77 are made of an opaque flexible silicone material, allowing the overall flexible member 70 to form a flexible silicone strip/belt equipped with the elastic and recovery capabilities.

In addition, the internal of the light transmissive portion 71 includes a cavity 72, and the cavity 72 has an elongated shape identical to the extension direction of the flexible member 70. The light emitting assembly 20 is arranged inside the cavity 72, and comprises a plurality of light emitting elements 21 arranged spaced apart from each other and a conductor for connecting the light emitting elements 21. The light emitting elements 21 are the same as the previous embodiment and refer to small size LED modules. The conductor can be a flexible conductor board 23, and the conductor board 23 penetrates into the cavity 72 along the extension direction of the flexible member 70.

The flexible member 70 includes a slot 74 formed at one side of the first light shielding portion 75 away from the cavity 72. The slot 74 is formed between two protrusions 741 with recovery elasticity and used for clamping and securing to a metal wire 30. In addition, the opening 742 of the slot 74 is formed at one side of the slot 74 away from the cavity 72. The slot 74, the two protrusions 741 and the opening 742 extend along the extension direction of the flexible member 70. The inner side of the slot 74 is of a circular arc shape (extension projection plane or cross sectional area), the cut-out portion of the slot 74 is the opening 742, and its width is between its radius and diameter, and a width corresponding to the central angle of 60~100 degree is preferred. Accordingly, with the recovery elasticity of the material, it is able to achieve the effect of facilitated installation and stable clamping securement without disengagement.

In this embodiment, the light strip 7 is blocked by the first, second and third light shielding portions 75, 76, 77 at three directions respectively, such that the light emitted from the light emitting assembly 20 is centralized at one side that is not blocked for light output. Accordingly, through the hollow channel 73 arranged at such side, the light strip 7 is able to achieve the uniform and gentle lighting effect at one side.

The above description is provided to explain the preferred embodiments of the present invention only, and any extension, modification, mere change or equivalent replacement made according to the technical means of the present invention shall be considered to be within the claim scope of the present invention.

What is claimed is:

1. A light strip facilitated for shape forming using a wire, comprising:
a flexible member of an elongated shape, and comprising a light transmissive portion and a cavity formed inside the light transmissive portion and extending along the flexible member; and
a light emitting assembly comprising a plurality of light emitting elements arranged spaced apart from one another inside the cavity, wherein
the flexible member has, at one side thereof, two protrusions that each have a recovery elasticity, protrude away from the cavity, and extend along the flexible member, so as to form a slot between the two protrusions and extending along the flexible member, and
the protrusions are shaped to secure the wire in the slot therebetween, so as to clamp the light strip to the wire along the wire.

2. The light strip facilitated for shape forming according to claim 1, wherein in a sectional view of the light strip,
the flexible member has an arc shape, and
a width of the opening of the slot is between a radius and a diameter of the slot.

3. The light strip facilitated for shape forming according to claim 2, wherein a central angle corresponding to the opening of the slot is between 60~100 degree.

4. The light strip facilitated for shape forming according to claim 3, wherein the flexible member further comprises a hollow channel arranged at the light transmissive portion, and the hollow channel is located at another side of the cavity opposite from the slot.

5. The light strip facilitated for shape forming according to claim 3, wherein the flexible member further comprises a first light shielding portion attached to one side of the light transmissive portion, and the slot is formed at the first light shielding portion.

6. The light strip facilitated for shape forming according to claim 5, wherein the flexible member further comprises a hollow channel arranged at the light transmissive portion, and the hollow channel is located at another side of the cavity opposite from the slot.

7. The light strip facilitated for shape forming according to claim 5, wherein the flexible member further comprises a second light shielding portion attached to another side of the light transmissive portion opposite from the first light shielding portion.

8. The light strip facilitated for shape forming according to claim 7, wherein the flexible member further comprises a third light shielding portion attached to one side of the light transmissive portion adjacent to the first light shielding portion, and the third shielding portion is connected to the first light shielding portion and the second light shielding portion respectively.

9. The light strip facilitated for shape forming according to claim 8, wherein the flexible member further comprises a hollow channel arranged at the light transmissive portion, and the hollow channel is located at another side of the cavity opposite from the third light shielding portion.

10. The light strip facilitated for shape forming according to claim 1, wherein the flexible member further comprises a hollow channel arranged at the light transmissive portion, and the hollow channel is located at another side of the cavity opposite from the slot.

11. The light strip facilitated for shape forming according to claim 1, wherein the flexible member further comprises a first light shielding portion attached to one side of the light transmissive portion, and the slot is formed at the first light shielding portion.

12. The light strip facilitated for shape forming according to claim 11, wherein the flexible member further comprises a hollow channel arranged at the light transmissive portion, and the hollow channel is located at another side of the cavity opposite from the slot.

13. The light strip facilitated for shape forming according to claim 11, wherein the flexible member further comprises a second light shielding portion attached to another side of the light transmissive portion opposite from the first light shielding portion.

14. The light strip facilitated for shape forming according to claim 13, wherein the flexible member further comprises a third light shielding portion attached to one side of the light transmissive portion adjacent to the first light shielding portion, and the third shielding portion is connected to the first light shielding portion and the second light shielding portion respectively.

15. The light strip facilitated for shape forming according to claim 14, wherein the flexible member further comprises a hollow channel arranged at the light transmissive portion, and the hollow channel is located at another side of the cavity opposite from the third light shielding portion.

16. The light strip facilitated for shape forming according to claim 15, wherein the light emitting assembly further comprises a conductor connected to the light emitting elements, the conductor is formed by at least one flexible conductive wire or a flexible conductive board, and the conductor penetrates into the cavity along the flexible member.

17. The light strip facilitated for shape forming according to claim 13, wherein the light emitting assembly further comprises a conductor connected to the light emitting elements, the conductor is formed by at least one flexible conductive wire or a flexible conductive board, and the conductor penetrates into the cavity along the flexible member.

18. The light strip facilitated for shape forming according to claim 1, wherein the light emitting assembly further comprises a conductor connected to the light emitting elements, the conductor is formed by at least one flexible conductive wire or a flexible conductive board, and the conductor penetrates into the cavity along the flexible member.

19. A shaped light ornament, comprising:
a stand portion formed by at least one flexible shaping metal wire;
a light strip facilitated for shape forming using the least one flexible shaping metal wire, comprising:
a flexible member of an elongated shape, and comprising a light transmissive portion and a cavity formed inside the light transmissive portion and extending along the flexible member; and
a light emitting assembly comprising a plurality of light emitting elements arranged spaced apart from one another inside the cavity, wherein
the flexible member has, at one side thereof, two protrusions that each have a recovery elasticity, protrude away from the cavity, and extend along the flexible member, so as to form a slot between the two protrusions and extending along the flexible member, and
the protrusions are shaped to secure the at least one flexible shaping metal wire in the slot therebetween, so as to clamp the light strip to the at least one flexible shaping metal wire along the at least one flexible shaping metal wire, such that the light strip is installed and fixed to the stand portion, thereby forming the shaped light ornament.

20. A shaped light ornament, comprising:

a stand portion formed by at least one flexible shaping metal wire;

a light strip facilitated for shape forming using the at least one flexible shaping metal wire, comprising:

a flexible member of an elongated shape, and comprising a light transmissive portion and a cavity formed inside the light transmissive portion and extending along the flexible member; and a light emitting assembly comprising a plurality of light emitting elements arranged spaced apart from one another inside the cavity, wherein wherein the flexible member includes a first light shielding portion and a second light shielding portion respectively attached to two opposite sides of the light transmissive portion, and extend along the flexible member, the first light shielding portion has, at one side thereof, two protrusions that each have a recovery elasticity, and an opening of the slot is formed at protrude away from the cavity, and extend along the flexible member, so as to form a slot between the two protrusions and extending along the flexible member, and the protrusions are shaped to secure the at least one flexible shaping metal wire in the slot therebetween, so as to clamp the light strip to the at least one flexible shaping metal wire along the at least one flexible shaping metal wire; and, wherein such that the light strip is installed and fixed to the stand portion, thereby forming the shaped light ornament.

* * * * *